R. B. NORTH.
AUTOMATIC APPARATUS FOR CONTROLLING THE SUPPLY OF GAS TO BURNERS.
APPLICATION FILED JULY 5, 1910.

982,384.

Patented Jan. 24, 1911.

2 SHEETS—SHEET 1.

Witnesses
B. M. Sommers
May Ellis

Inventor,
Robert Benson North
By Henry Orth Jr.
Atty

THE NORRIS PETERS CO., WASHINGTON, D. C.

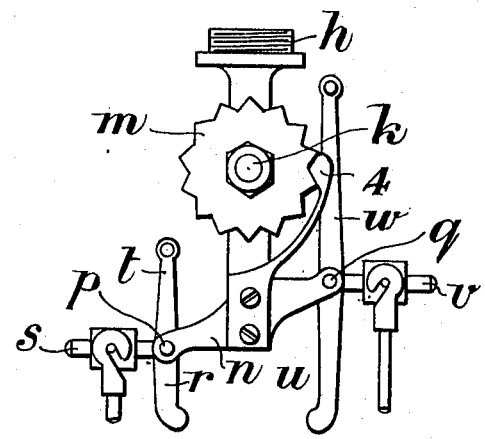
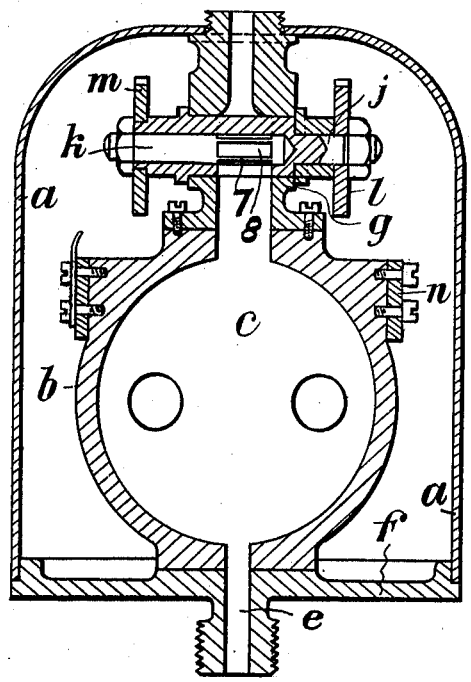
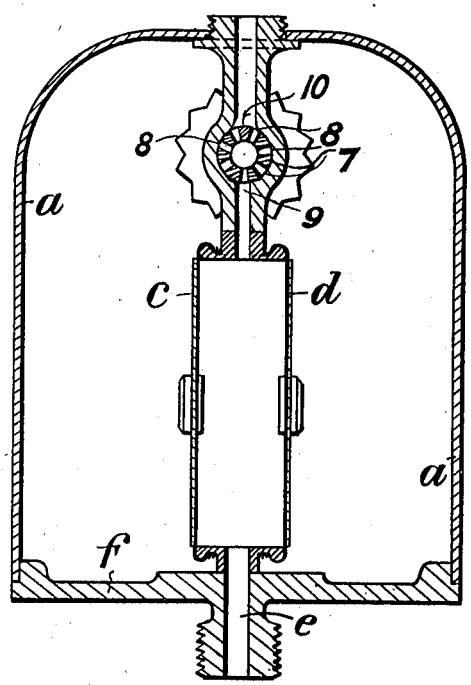

UNITED STATES PATENT OFFICE.

ROBERT BENSON NORTH, OF WESTMINSTER, ENGLAND.

AUTOMATIC APPARATUS FOR CONTROLLING THE SUPPLY OF GAS TO BURNERS.

982,384. Specification of Letters Patent. Patented Jan. 24, 1911.

Application filed July 5, 1910. Serial No. 570,483.

*To all whom it may concern:*

Be it known that I, ROBERT BENSON NORTH, a subject of the King of Great Britain, residing at No. 14 Soho Square, Soho, in the city of Westminster, in the county of Middlesex, England, manufacturer, have invented new and useful Improvements in Automatic Apparatus for Controlling the Supply of Gas to Burners, of which the following is a specification.

This invention relates to improvements in automatic apparatus for controlling the supply of gas to burners and has for its object to improve that type of apparatus the automatic action of which, in turning the gas valve to raise or to lower the lights, is dependent upon variations of pressure set up in the system.

In carrying the invention into practice a diaphragm chamber, preferably consisting of a flat chamber both sides of which are expansible oppositely or outwardly, is arranged to operate upon two dissimilarly weighted pawl levers or two dissimilar weighted pawl levers, a preliminary or partial collapse of the diaphragm chamber causing one pawl lever to turn a ratchet wheel one step, further collapse of the diaphragm chamber causing the other pawl lever to turn the ratchet wheel another step and the subsequent raising of the pressure resetting the pawls ready for the next reduction of pressure. The variations of pressure may be arranged to succeed one another and to be utilized in the following manner:—
Upon the gas pressure being raised to the normal, or abnormally, the pawls are reset; upon the pressure being then lowered to normal, or below normal, one of the pawls operates the ratchet wheel to turn on the supply to the burner or burners; and upon then abnormally lowering the pressure the other pawl operates the ratchet wheel to turn off the gas.

In order to enable the invention to be readily understood reference is made to the accompanying drawings in which:—

Figure 1:
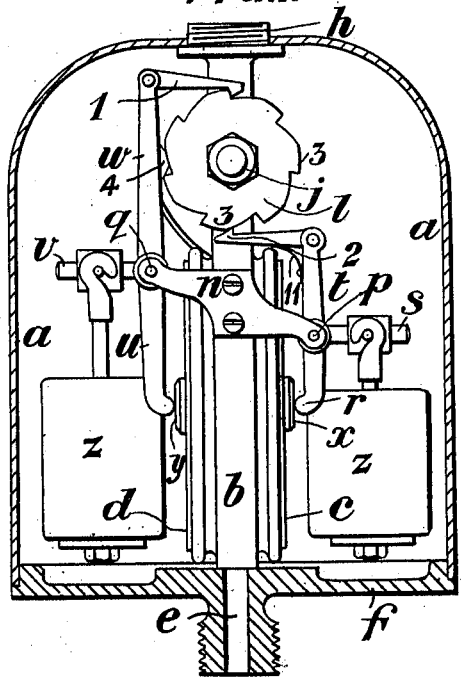
Figure 3:
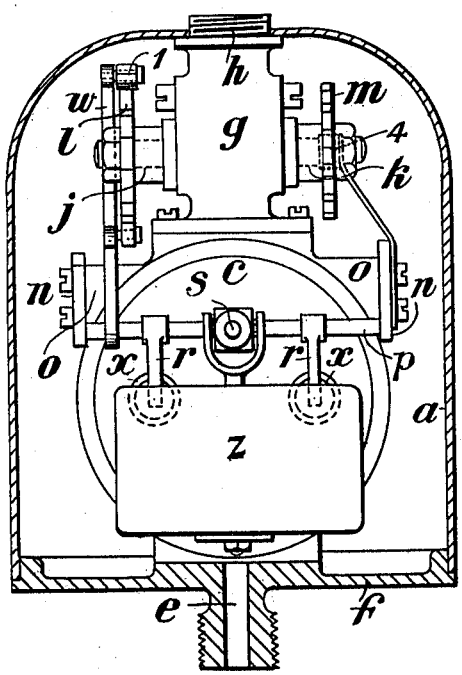
Figure 2:
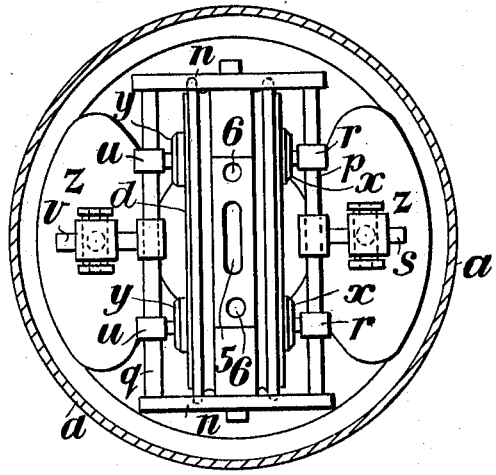
Figure 4:
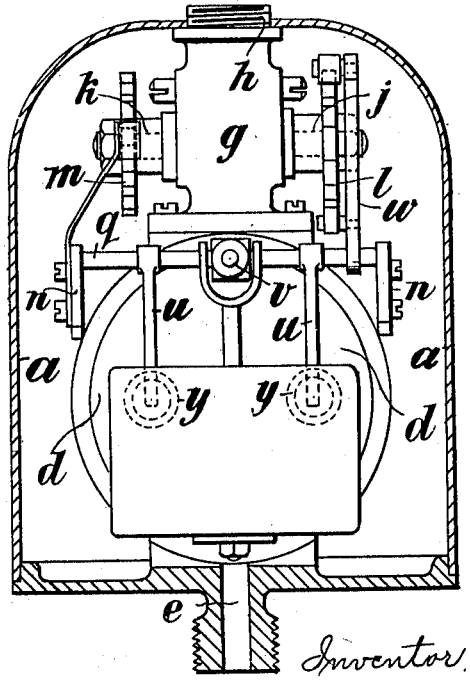

Figure 1 is a side elevation of the improved controlling mechanism the casing being shown in vertical section. Fig. 2 is a plan of Fig. 1 the casing being seen in horizontal section and the valve casing and ratchet and pawls being removed. Fig. 3 is a view seen from the right hand side of Fig. 1. Fig. 4 is a view seen from the left hand side of Fig. 1. Fig. 5 is a side elevation of the pawl mechanism removed, and as viewed from the rear side of Fig. 1. Fig. 6 is a central vertical section of the diaphragm chamber the section being taken in a plane parallel with the planes containing the diaphragms, and Fig. 7 is a central vertical section taken at right angles to the plane of the section in Fig. 6.

In the accompanying drawings which illustrate a simple construction according to these improvements $a$ is a bell-like casing within which is arranged, preferably centrally, a flat circular chamber $b$ the two flat sides of which are constituted by flexible diaphragms $c\ d$. The diaphragm chamber communicates with a gas supply connection $e$ in the floor $f$ of the casing $a$ and a valve casing $g$ is conveniently bolted or screwed down on to the top of the casing $b$, a discharge connection $h$ of the valve casing $g$ being arranged to just protrude through the top of the bell-like casing $a$. The plug 7 of the valve which works in the casing $g$ has spindle parts $j\ k$ extending from respective ends and conveniently lying in about the plane of the diaphragm chamber $b\ c\ d$. Upon one of such spindle parts, viz. $j$, a ratchet wheel $l$ is fixed and upon the other part, viz. $k$, a star wheel $m$ is fixed, the points of the star wheel $m$ being suitably twice the number of teeth upon the ratchet $l$, convenient numbers being seven upon the ratchet $l$ and fourteen upon the star wheel $m$. The plug in this case must therefore also have seven slots or ports 8 if hollow, or seven cored passages is solid, for registering with the inlet and outlet ports 9 and 10 respectively in any one of the seven positions. Brackets or arms $n$ are secured say to lugs $o$ cast on the narrow circular wall $b$ of the diaphragm chamber and extend outwardly beyond the flat faces $c\ d$ of this chamber and are thus adapted to support the pivots or shafts $p\ q$ of three-armed levers $r\ s\ t$ and $u\ v\ w$. The arms $r\ u$ may be duplicated as shown and may extend downwardly and contact with suitable bosses or projections $x\ y$ on the diaphragms $c\ d$ respectively. The arms $s\ v$ extend about horizontally outward and are weighted, preferably by suspending weights $z$ therefrom. The third arms $t$ and $w$ extend upwardly and are provided each with a pawl 1 and 2 respectively engaging the ratchet wheel $l$. It is advantageous to duplicate the arms $r$ and $u$ and to space the members of each pair some distance apart, so that the strain is not placed upon the center of the diaphragms c d but to each side thereof.

The upwardly and downwardly extending arms w, u in connection with the diaphragms d are of greater length than the arms r t in connection with the diaphragms c and the pawl 1 of the arm w takes over the top of the ratchet wheel l, whereas the pawl 2 of the shorter arm t takes under the ratchet wheel l and is maintained in engagement therewith by any suitable means such as a spring 11. The teeth of the ratchet may be cut each with a part-circular peripheral portion for say half the length of each tooth as indicated at 3 for a reason which will presently appear, and it is arranged that when the upper pawl 1 is just in engagement with a tooth, the lower pawl 2 is just beginning to contact with the circular portion 3 of the periphery of the tooth which is then opposite to it as seen in Fig. 1. Suppose now that with the parts in this position the gas pressure is reduced, the diaphragm chamber will partially collapse and will permit the corresponding weight z to cause the pawl 1 upon the longer lever w to move an appreciable amount and to turn the ratchet wheel l to the extent of say half a tooth thereby turning the cock in the casing g to turn on the gas; during this movement the lower pawl 2 merely rubs against the circular portion 3 of the adjacent ratchet tooth and finally takes behind the more or less radial face thereof, the amount of movement of the diaphragm however is insufficient to permit the smaller lever t to give its pawl 2, any driving movement. Upon further and abnormal reduction of the pressure, the weight z belonging to the smaller lever r s t is permitted to move the latter to an appreciable extent and the pawl 2 being found in engagement with the tooth as aforesaid, the ratchet wheel l is at once turned to the extent of half, or the remainder of, a tooth and the cock is turned to turn off the gas. When the pressure is again raised to the normal, or to an abnormal degree, the diaphragms c d will be again expanded or distended and will reset the pawls in the position shown in Fig. 1, the pawl 1 of the longer lever w taking behind the tooth next to that which it last engaged, and the pawl 2 of the shorter lever t, after having ridden up the inclined portion of the next succeeding tooth, resting at about the commencement of the more or less circular portion 3 of the periphery of such tooth. A click or detent 4, Fig. 5, is arranged to engage between the points of the star wheel m above referred to and this wheel m having fourteen points, its movement and therefore the movement of the ratchet wheel l will be arrested at each step by step movement of the latter. It is obvious however that the details of the device and mode of operation may be varied without departing from the invention, inasmuch as different conditions of pressure, and different pressure variations, appertain to different systems, and the improved apparatus can be readily adapted to suit any of these.

In Fig. 2, 5 is the port hole opening from the diaphragm chamber into the cock casing and 6 are screw holes for enabling the cock casing g to be secured to the casing b.

What I claim as my invention, and desire to secure by Letters Patent is:—

1. Automatic gas controller comprising in combination a chamber, a gas supply thereto, a gas exit therefrom, a valve in said exit, two diaphragms in the walls of said chamber, operative connections between said diaphragms and said valve and means adapted to oppose the movement of said diaphragms under the action of gas pressure one of said diaphragms and operative connections being adapted to move said valve from the closed to the open position during a certain change of pressure in the supply and the other of said diaphragms and operative connections being adapted to move said valve from the open to the closed position during further change in said pressure.

2. Automatic gas controller comprising in combination a chamber, a gas supply thereto, a gas exit therefrom, a valve in said exit, two diaphragms in the walls of said chamber, two levers adapted to be operated by said diaphragms, means constantly operative upon said levers to resist the action of said diaphragms, operative connections between said levers and said valve said connections being successively operative under the action of successive changes in gas pressure to move the valve from closed to open position during one change of pressure and to move the valve from open to closed position during another change of pressure.

3. Automatic gas controller comprising in combination a chamber, a gas supply thereto, a gas exit therefrom, a valve in said exit, two diaphragms oppositely arranged and constituting walls of said chamber, two levers in operative relation with respective diaphragms, weights operative upon said levers to resist the action of the said diaphragms under gas pressure, operative connections between said levers and said valve, said connections being successively operative under the action of successive changes in gas pressure to move the valve from closed to open position during one change of pressure and to move the valve from open to closed position during another change of pressure.

4. Automatic gas controller comprising in combination a chamber, a gas supply thereto, a gas exit therefrom, a rotary valve in said exit, a ratchet wheel fixed on the spindle of said valve, two diaphragms oppositely arranged and constituting walls of said chamber, two lever arms each pivoted with its extremity in contact with a respective diaphragm dissimilar loads upon said diaphragms and pawl gears operatively connected between respective lever arms and said ratchet wheel.

5. Automatic gas controller comprising in combination a chamber, a gas supply thereto a gas exit therefrom, a rotary valve in said exit a ratchet wheel fixed on the spindle of said valve, two diaphragms oppositely arranged and constituting walls of said chambers, a weighted three-armed lever system in operative connection with one of said diaphragms and with a pawl taking over said ratchet wheel, a second weighted three-armed lever system of different dimensions in operative connection with the other of said diaphragms and with a pawl taking under said ratchet wheel and means for maintaining said pawl in engagement with said ratchet.

6. Automatic gas controller comprising in combination a chamber, a gas supply thereto, a gas exit therefrom, a rotary valve in said exit, a ratchet wheel fixed on the spindle of said valve, two diaphragms oppositely arranged and constituting walls of said chamber two cross shafts mounted in bearings one shaft adjacent each diaphragm, downwardly directed arms on each of said shafts the free ends of said arms bearing upon respective diaphragms, outwardly directed arms upon each of said shafts, weights upon said outwardly directed arms, an upwardly directed arm on each of said shafts one of such arms being connected with a pawl working over said ratchet wheel and the other of such arms being connected with a pawl working under said ratchet wheel, the last named arms and the pawls being of such length and so disposed that when one pawl engages with a tooth the other is riding upon the periphery of another tooth between the extremities of the latter.

7. Automatic gas controller comprising a chamber, a gas supply thereto, a gas exit therefrom, a rotary valve in said exit, a ratchet wheel fixed on the spindle of said valve, a diaphragm on said chamber adapted to respond to changes of pressure between predetermined limits, a second diaphragm on said chamber adapted to respond to changes of pressure between other predetermined limits, and operative connections between each of said diaphragms and said ratchet wheel.

8. Automatic gas controller comprising in combination a chamber, a gas supply thereto, a gas exit therefrom, a rotary valve in said exit having a plurality of ports, a wheel fixed on the spindle of said valve, ratchet teeth on said wheel corresponding in number with the number of said ports the periphery of each tooth comprising a part circular portion, two diaphragms oppositely arranged and constituting walls of said chamber, two cross shafts mounted in bearings one shaft adjacent each diaphragm, downwardly directed arms on each of said shafts the free ends of said arms bearing upon respective diaphragms, outwardly directed arms upon each of said shafts, weights upon said outwardly directed arms, an upwardly directed arm on each of said shafts, one of such arms being connected with a pawl working over said ratchet wheel and the other of such arms being connected with a pawl working under said ratchet wheel, the last named arms and the pawls being of such length and so disposed that when one pawl is engaged with its tooth and feeding the ratchet the other pawl is riding upon the part-circular portion of the periphery of another tooth substantially as set forth.

In testimony whereof I have signed my name to this specification in the presence of two subscribing witnesses.

ROBERT BENSON NORTH.

Witnesses:
P. PHILLIPS,
H. D. JAMESON.